United States Patent [19]

Waite et al.

[11] Patent Number: 4,688,170

[45] Date of Patent: Aug. 18, 1987

[54] COMMUNICATIONS NETWORK FOR COMMUNICATING WITH COMPUTERS PROVIDED WITH DISPARATE PROTOCOLS

[75] Inventors: David P. Waite, Alexandria; Horace G. Riddell, Chantilly, both of Va.

[73] Assignee: Tau Systems Corporation, Falls Church, Va.

[21] Appl. No.: 534,687

[22] Filed: Sep. 22, 1983

[51] Int. Cl.⁴ .................................................. G06F 3/00
[52] U.S. Cl. ...................................... 364/200; 340/717
[58] Field of Search ... 364/200 MS File, 900 MS File; 340/722, 717, 750, 802, 814

[56] References Cited

U.S. PATENT DOCUMENTS

| | | | |
|---|---|---|---|
| 4,356,475 | 10/1982 | Neumann et al. | 340/521 |
| 4,425,664 | 1/1984 | Sherman et al. | 375/8 |
| 4,453,211 | 6/1984 | Askinazi et al. | 364/200 |
| 4,463,380 | 7/1984 | Hooks, Jr. | 358/160 |
| 4,471,348 | 9/1984 | London et al. | 340/722 |
| 4,493,021 | 1/1985 | Agrawal et al. | 364/200 |
| 4,493,051 | 1/1985 | Brezzo et al. | 364/900 |
| 4,494,194 | 1/1985 | Harris et al. | 364/200 |

*Primary Examiner*—Archie E. Williams, Jr.
*Assistant Examiner*—David L. Clark
*Attorney, Agent, or Firm*—Hoffman, Wasson & Fallow

[57] ABSTRACT

A global data network communication system for communicating between diverse computer systems, each system provided with different protocols used to transmit, receive and understand information. At least one of the computer systems contains a memory into which a directory of information is stored to recognize the various protocols which are received from diverse computers and/or to transmit information to these diverse computers. This information contains the specific protocol which is being utilized by the diverse computer systems. A channel selector is provided which allows operator selection of the specific protocol characteristics of the particular station with which you wish to communicate.

10 Claims, 2 Drawing Figures

COMMUNICATIONS NETWORK FOR COMMUNICATING WITH COMPUTERS PROVIDED WITH DISPARATE PROTOCOLS

BACKGROUND OF THE INVENTION

Due to various recent technological advances, the cost and size of many computers and data processing systems have greatly decreased. These advances, therefore, have allowed many small corporations and individuals to become a part of the "computer age". However, because computers and data processing systems are produced by an industry which does not use compatible equipment or standardized protocols consisting of the data bit rate and data format characteristics, it is impossible for various computer systems to communicate with one another.

If various individuals utilizing diverse computer hardware wish to communicate with a central computer or other individual computers, a system must be developed in which diverse computers or users can communicate. Presently, these computers transmit and receive data at a number of different bit rates and are configured to handle data in a number of different data formats, each having its own characteristics. Data which is transmitted from one computer at a particular rate and data format would be unintelligible to the user of a second computer which does not utilize a similar rate and data format.

While this problem is not a new one, no single system or device has been perfected for easily communicating between two main frame computers or remote terminals which utilize different data rates or data formats.

For example, prior art systems have been developed which employ adapters capable of being automatically configured to receive variously encoded data. Such automatic configuration may be accomplished either by hardware or by a program executed in the central computer. While this type of communications adapter provides the means for dynamically balancing data processing tasks and different data formats between different data channels, the exact means for initially identifying the exact configuration of each remote terminal is inadequate.

Additionally, prior art devices have been developed in which either a software program or the computer hardware is used to analyze incoming data to determine the exact data rate and the particular data format which is being utilized. However, these systems are quite costly and complex since an algorithm must be developed in which a multitude of data rates and data formats is provided. The prior art system must then contain an algorithm which can identify each one of these data rates and data formats based upon the received information. After the proper data rate and data format have been determined, the hardware or algorithm must then alter the computer in such a manner so that it would readily understand the received data. No provision in this prior art system is made for altering the transmitted data based upon the particular data rate and data format of the computer to which the data is being transmitted.

SUMMARY OF THE INVENTION

The present invention overcomes the deficiencies of the prior art by providing a global communications network between various main frame computers, minicomputers, portable computers or various combinations thereof, utilizing different data rates and data formats. A program is provided into the memory of at least one of the computers in the global network which contains a listing of the various data rates and data formats for a plurality of computers with which the first computer could conceivably communicate. This listing could either be in the form of a software program or could be hard-wired into the computer.

In use, the individual user would determine the computer to which he desired to communicate and then would indicate to his computer the "channel" number of the computer to which he wishes to communicate. Thereafter, the individual's computer would "log-on" to the second computer and would be aware of the particular data rate and data format of the incoming data by means of the channel directory. Conversely, if the sending computer and not the receiving computer contains the present invention, the sending computer would transmit information at the correct data rate and in a data format which can be understood by the receiving computer.

Additionally, if both computers utilize the present invention, entire files can be transferred from one computer to another computer in a series arrangement without having to request a new file each time after a previous file has been transmitted and received.

Furthermore, the present invention contains a system in which data is presented to a display screen, such as a CRT, simultaneously as it is receiving and printing the received data, although the rates at which each of these features is accomplished are different.

Additionally, the system of the present invention includes a feature whereby data is displayed on the CRT at a variable update under operator control, such that captured or incoming data may be reviewed by the operator.

These and other features of the present invention will become more fully apparent from the following description and attendant claims taken in conjunction with the accompanying drawings.

DETAILED DESCRIPTION OF THE INVENTION

Figure 1:
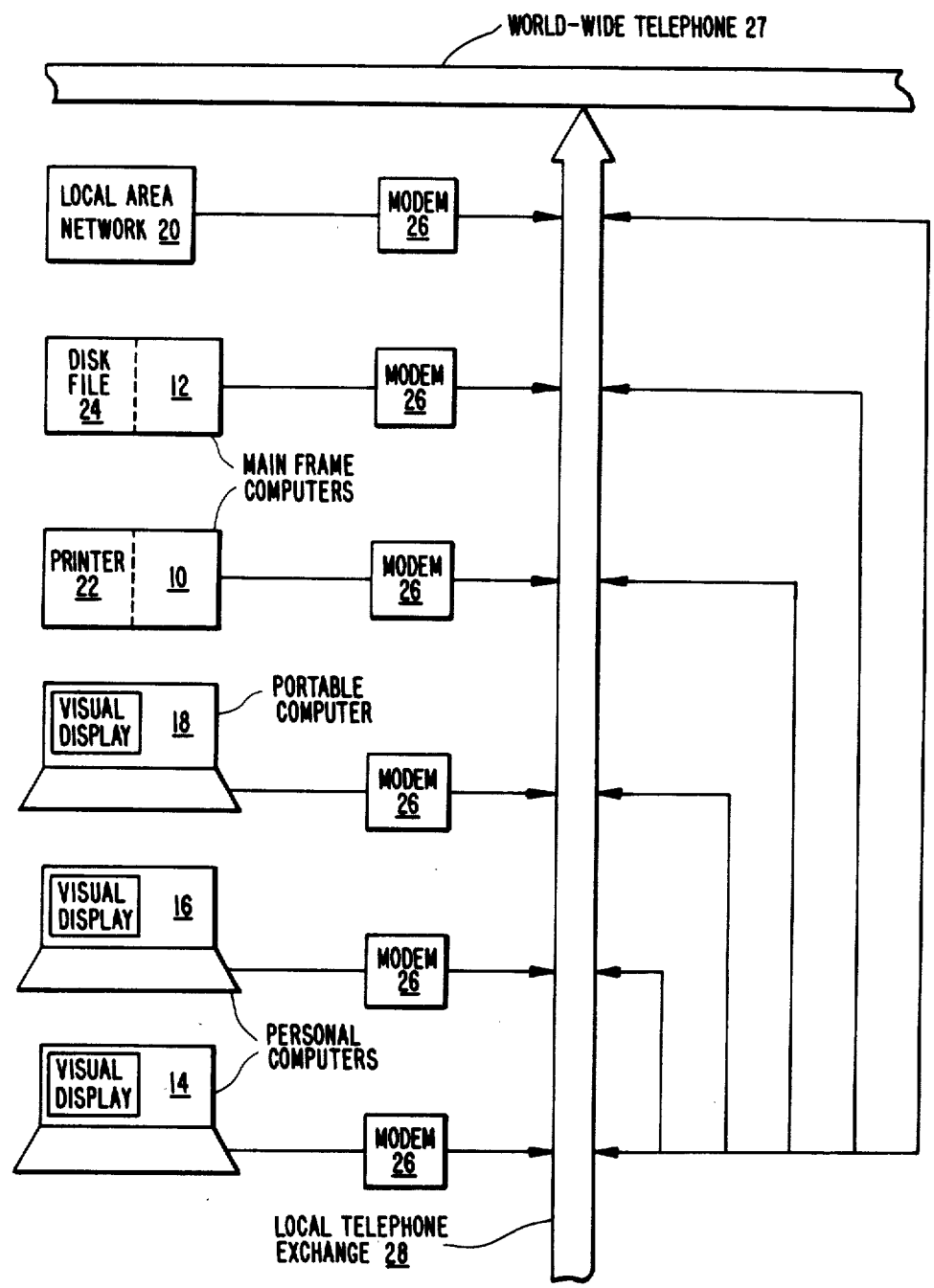
FIG. 1 is a functional block diagram of the system embodied in the present invention.

The present invention, as is shown in FIG. 1, is directed to a computer communication system in which various computers, each employing diverse data rates and data formats for receiving and transmitting data, can communicate intelligibly with one another. This communication network can, for example, include a number of diverse main frame computers 10,12, a number of personal computers 14,16, a portable computer 18 and a local area network gateway 20. The main frame computers 10 and 12 as well as the personal computers 14 and 16 could include such peripherals as a printer 22 and a disk file 24. All of the computers communicate with one another through independent modems 26 and a world-wide telephone system 27 or local telephone exchange 28.

However, as indicated hereinabove, since the various computers which utilize this communication network are programmed to transmit or receive data based upon specific bit rates and data formats, communications between these various computers will be impossible unless each individual computer has knowledge of these various bit rates and data formats. For example, each of the data formats would include a data packet having a parity bit, would be of various word lengths, would include a cyclic redundancy check and would either be synchronous or asynchronous. The present invention allows communication between these systems by providing a program which is inputted into the random access memory of at least one of the computers. This program would contain the various bit rates and data formats which are utilized by the various types of computers with which the computer wishes to communicate. Often, the program which is inputted into the storage would not contain these specific data bit rates and data formats, but would contain the information needed to implement a system for simulating the various data rates and data formats. In this situation, the individual user would determine the various data bit rates and data formats which are used to communicate with the computers of interest and would input this information into the computer himself.

Figure 2:
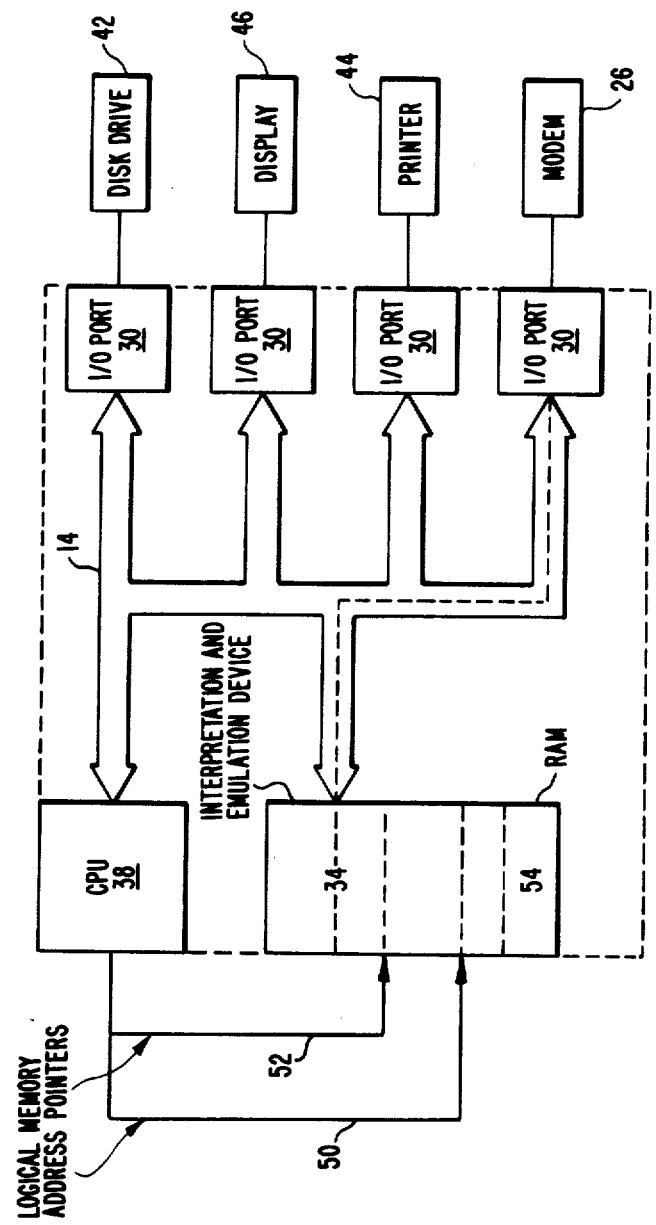
FIG. 2 is a block diagram of a computer utilizing the system of the present invention and illustrates the spooling principal of the present invention.

FIG. 2 shows a rudimentary block diagram of a local computer 14 which utilizes the channel selector of the present invention to communicate with various computers, each computer utilizing different data bit rates and data formats. The specific data bit rate and data format for establishing communication with a remote computer is selected from a channel directory provided within the local computer's memory.

The purpose of this arrangement is to allow operators to easily select a communication link with any remote station to which they have been granted access. This feature allows a network of remote stations to be capable of communicating with each other, so long as they know the data bit rate and data format of the remote station.

A program for emulating the various data rates and data formats of diverse computers would be introduced into a portion 54 of a random access memory 34 by a disk drive 42 through an input/output port 30. Additionally, all of the timing and control logic is included in a central processing unit (CPU) 38. The computer would also include various peripherals such as a printer 44 and a CRT display 46 which communicate with the computer 14 through separate input/output ports 30. The modem 26 is used to allow the computer 14 to communicate over the communications networks 27,28.

The channel directory stores information within the computer relating to the bit rates and data formats of various computers. This directory would indicate to the local computer, for example, the data rate, the specific kind of parity which is being utilized, the word length of a data packet, the type of cyclic redundancy check which is employed and whether the data is synchronous or asynchronous, of various remote computers. This information allows the local computer to emulate the remote computer's data bit rates and data formats.

Each record in the channel directory describes the link logic for a single remote computer. A channel number is assigned to each record so that the appropriate record may be selected from the directory. This directory serves as a logical switch for routing data communication traffic to any of several stations on a star network configuraton.

It should be noted that only one of the computers in the communications network need employ this channel directory program. This same program also contains instructions for the computer to set various internal switches and other devices for emulating the data rates and the data formats of the disparate computers in the network.

Another feature of the present invention is the use of a controllable buffer scan. Generally, when information is being sent over communications lines, it is initially inputted into a random access memory capture buffer 34. As shown in FIG. 2, capture buffer 34 dedicates a portion of the buffer 54 to store the channel directory, and the remaining portion to hold received data for a relatively short period of time. These data bits are received at different relative speeds than the speed with which this data would appear on a cathode ray tube or which would be printed on a printer.

In many cases, the data is initially introduced into the capture buffer 34 until this buffer has reached its maxium capacity. At this time, the computer must make a decision whether to retain or dispose of the data and if it determines that the data is to be retained, it must determine whether the data is then transmitted either to a CRT 46, to a printer 44 or to a disk storage. Since the computer is usually not capable of determining whether data should be retained or disposed, this decision must be made by the user of the computer system. Generally, the information is then presented to the CRT and the user determines whether the information should be disposed or retained by a printer, magnetic disk or other type of memory.

Because the rate that the computer receives data is different than the rate the data can be displayed on a CRT or retained by a disk storage memory or printed on a printer, it is imperative that the computer can present data to these various peripherals at a rate other than the rate that the data is inputted into the capture buffer. Referring again to FIG. 2, the dashed line provided within the internal bus of the computer represents the data which is being received by the computer 14 and is stored in the portion of the capture buffer 34, not dedicated to the channel directory. A keyboard associated with the CRT 46 of the computer controls the rate that the data is scrolled to the CRT through the use of a logical memory address pointer 50 under the control of the CPU 38. A second logical memory address pointer 52 is associated with the printer 44, also under the control of the CPU 38. The keyboard contains a control which would automatically and continuously alter the rate of the data presented to the CRT independent of the data print rate of the printer. Simultaneously, data is read through the input/output port 30 into the capture buffer 34.

This invention may be embodied in other specific forms without departing from its spirit or essential characteristics. The described embodiments are to be considered in all respects only as illustrative and not restrictive, and the scope of the invention is, therefore, indicated by the appended claims, rather than by the foregoing description. All changes which come within the meaning and range of equivalency of the claims are to be embraced within their scope.

What is claimed is:

1. In a communications network involving a plurality of diverse stand-alone computers, each computer provided with an input/output port and communicating via data lines in synchronous or asynchronous modes, and each computer utilizing protocols including but not limited to a data format and bit rate specific to that computer, the improvement comprising:

a plurality of first initiating diverse stand-alone computers provided in the communications network;

a plurality of second remote diverse stand-alone computers communicating with said first computers via the communications network;

a single memory unit physically provided in each of said plurality of first initiating diverse stand-alone computers containing data information stored therein indicating the protocols, including the data format and bit rate of each of said plurality of first and second diverse stand-alone computers in the communications network, said data information including a data packet indicating the nature of, the absence or presence of a parity bit, the word length of said data information, the absence or presence of a cyclic redundancy check and whether said data information is in a synchronous or asynchronous mode, said memory unit connected to the input-/output port of its respective computer; and emulation means physically provided in said plurality of first computers and connected to said memory unit of each of said first computers for sending and receiving data utilizing the protocols of said plurality of first computers and said plurality of said second computers, including the data format and the bit rates of both said plurality of first and said plurality of second computers in the communications network, said data information including a data packet indicating the nature of, the absence or presence of a parity bit, the word length of said data information, the absence or presence of a cyclic redundancy check and whether said data information is in a synchronous or asynchronous mode to the input, whereby each of said first computers can automatically communicate with computers in both of said plurality of first and said plurality of second computers in the communications network based upon the storage, in the memory unit of each of said plurality of first computers, of the protocols, including the data format and the bit rate utilized by said plurality of first and said plurality of second computers in the communications network and regardless of whether said plurality of second computers is provided with said single memory unit or said emulation means.

2. In the communications network of claim 1 wherein each of said plurality of first computers further includes:

a capture buffer means provided in each of said plurality of first computers and in communication with said emulation means for receiving data from one of said plurality of first computers or one of said plurality of second computers in the communications network at a first data rate;

a visual display;

a first logical means connected between said display and said capture buffer for displaying data on said display at a second data rate different than said first data rate;

a permanent data storage device for storing the data simultaneously with the data being displayed by said visual display; and a second logical means connected between said permanent data storage device and said capture buffer for inputting data into said permanent data storage device at a third data rate different than said first and second data rates.

3. In the communications network of claim 1, wherein said permanent data storage device is a printer.

4. In the communications network of claim 1, wherein said single memory unit is programmable.

5. A computer for communicating via a synchronous or asynchronous communications network with additional diverse stand-alone computers each utilizing particular protocols including but not limited to specific data formats and bit rates, said computer including:

an input/output port in communication with the communications network;

a single memory unit physically provided in said computer containing data information stored therein indicating the protocols, including the data format and bit rate of additional diverse stand-alone computers in the communication network, said data information including a data packet indicating the absence or presence of a parity bit, the word length of said data information, the absence or presence of a cyclic redundancy check and whether said data information is in a synchronous or asynchronous mode; and emulation means physically provided in said computer and connected to said memory unit for sending and receiving data utilizing the protocols, including but not limited to the data format and the bit rate of the additional diverse stand-alone computers in the communications network said data information including a data packet indicating the nature of, the absence or presence of a parity bit, the word length of said data information, the absence or presence of a cyclic redundancy check and whether said data information is in a synchronous or asynchronous mode to the input;

whereby said computer can automatically communicate with the additional diverse stand-alone computers in the communications network based upon the storage, in the memory unit of the computer, of the protocols, including the data format and the bit rate utilized by said diverse stand-alone computers, and regardless of whether the additional diverse stand-alone computers include said memory unit or said emulation means.

6. The computer in accordance with claim 5, further including:

a capture buffer means in communication with said emulation means for receiving data from diverse stand-alone computers in the communications network at a first data rate;

a visual display;

a first logical means connected between said display and said capture buffer for displaying data on said display at a second data rate different than said first data rate;

a permanent data storage device for storing the data simultaneously with the data being displayed on said visual display; and a second logical means connected between said permanent data storage device and said capture buffer for inputting data into said permanent data storage device at a third data rate, different than said first and second data rates.

7. The computer in accordance with claim 6 wherein said permanent data storage device is a printer.

8. The computer in accordance with claim 5, wherein said single memory unit is programmable.

9. In a communications network involving a plurality of diverse stand-alone computers, each computer provided with an input/output port and communicating via data lines in synchronous or asynchronous modes, and each computer utilizing protocols including but not limited to a data format and bit rate specific to that computer, the improvement comprising:

a plurality of first initiating diverse stand-alone computers provided in the communications network;

a plurality of second remote diverse stand-alone computers communicating with said first computers via the communications network;

a single programmable memory unit physically provided in each of said plurality of first initiating diverse stand-alone computers containing data information stored therein indicating the protocols, including the data format and bit rate of each of said plurality of first initiating diverse stand-alone computers each of said plurality of second remote diverse stand-alone computers in the communications network, said data information including a data packet indicating the absence or presence of a parity bit, the word length of said data information, the absence or presence of a cyclic redundancy check and whether said data information is in a synchronous or asynchronous mode, said memory unit connected to the input/output port of its respective computer; and emulation means physically provided in said plurality of first computers and connected to said memory unit of each of said first computers for sending and receiving data utilizing the protocols of said plurality of first computers and said plurality of said second computers, including the data format and the bit rates of both said plurality of first and said plurality of second computers in the communications network, said data information including a data packet indicating the nature of, the absence or presence of a parity bit, the word length of said data information, the absence or presence of a cyclic redundancy check and whether said data information is in a synchronous or asynchronous mode to the input, whereby each of said first computers can automatically communicate with computers in both of said plurality of first and said plurality of second computers in the communications network based upon the storage, in the single programmable memory unit of each of said plurality of first computers, of the protocols, including the data format and the bit rate utilized by said plurality of first and said plurality of second computers in the communications network and regardless of whether said plurality of second computers is not provided with said memory unit or said interpretation and emulation means.

10. A computer for communicating via a synchronous or asynchronous communications network with additional diverse stand-alone computers each utilizing particular protocols including but not limited to specific data formats and bit rates, said computer including:

an input/output port in communication with the communications network;

a single programmable memory unit physically provided in said computer containing data information stored therein indicating the protocols, including the data format and bit rate of additional diverse stand-alone computers in the communication network, said data information including a data packet indicating the absence or presence of a parity bit, the word length of said data information, the absence or presence of a cyclic redundancy check and whether said data information is in a synchronous or asynchronous mode; and diverse stand-alone computers in the communications network, and emulation means physically provided in said computer and connected to said memory unit for emulating the protocols, including but not limited to the data format and the bit rate of the additional diverse stand-alone computers in the communications network said data information including a data packet indicating the nature of, the absence or presence of a parity bit, the word length of said data information, the absence or presence of a cyclic redundancy check and whether said data information is in a synchronous or asynchronous mode to the input;

whereby said computer can automatically communicate with the additional diverse stand-alone computers in the communications network based upon the storage, in the single programmable memory unit of the computer, of the protocols, including the data format and bit rate utilized by the additional diverse stand-alone computers, and regardless of whether the additional diverse stand-alone computers include said memory unit.

* * * * *